(12) United States Patent
Baer et al.

(10) Patent No.: US 8,756,651 B2
(45) Date of Patent: Jun. 17, 2014

(54) POLICY COMPLIANCE-BASED SECURE DATA ACCESS

(75) Inventors: Graeme D. Baer, Seattle, WA (US); Gregory B. Roth, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/246,445

(22) Filed: Sep. 27, 2011

(65) Prior Publication Data
US 2013/0081101 A1    Mar. 28, 2013

(51) Int. Cl.
*G06F 21/00* (2013.01)
*G06F 21/57* (2013.01)
*H04L 29/06* (2006.01)

(52) U.S. Cl.
CPC .............. *G06F 21/577* (2013.01); *H04L 63/20* (2013.01)
USPC .............................................. 726/1; 713/168

(58) Field of Classification Search
CPC ........................ G06F 21/577; H04L 636/0869
USPC .......................................................... 726/1
See application file for complete search history.

(56) References Cited

U.S. PATENT DOCUMENTS 6,158,010 A  * 12/2000 Moriconi et al. ................. 726/1
6,618,593 B1 *  9/2003 Drutman et al. .......... 455/456.3
7,743,145 B2 *  6/2010 Kaler et al. .................. 709/225
8,010,997 B2 *  8/2011 Limont et al. .................... 726/3
8,156,536 B2 *  4/2012 Polk .................................. 726/1
2007/0006289 A1    1/2007 Limont et al.
2008/0320566 A1 * 12/2008 Herzog et al. .................... 726/4
2010/0064341 A1    3/2010 Aldera
2010/0115582 A1 *  5/2010 Sapp et al. ........................ 726/1
2010/0135178 A1 *  6/2010 Aggarwal et al. ............. 370/252

OTHER PUBLICATIONS

Barker et al. (NIST Special Publication 800-56B Aug. 2009).*
International Search Report and Written Opinion mailed Nov. 30, 2012 in Application No. PCT/US12/57383 filed Sep. 26, 2012.

* cited by examiner

*Primary Examiner* — Saleh Najjar
*Assistant Examiner* — Oleg Korsak
(74) *Attorney, Agent, or Firm* — Kilpatrick Townsend & Stockton, LLP (57) ABSTRACT

Access control techniques relate to verifying compliance with security policies before enabling access to the computing resources. An application is provided on a client that generates verification codes using an authentication seed. Prior to granting the client the authentication seed necessary to generate a verification code, a server may perform a policy check on the client. Some embodiments ensure that the client complies with security policies imposed by an authenticating party by retrieving a number of parameter values from the client and then determining whether those parameter values comply with the security policies. Upon determining that the client complies, the authentication seed is issued to the client. In some embodiments, the authentication seed is provided such that a policy check is performed upon the generation of a verification code. The client is given access to secure information when the client is determined to comply with the security policies.

37 Claims, 8 Drawing Sheets

POLICY COMPLIANCE-BASED SECURE DATA ACCESS

BACKGROUND

People are increasingly utilizing computing devices for a variety of different tasks, such as checking e-mail, accessing company information, and managing corporate contacts. As an increasing amount of information is being accessed through computing devices, there is an ever-increasing need to protect information stored on or accessible by computing devices. Policies may be applied to control access to various computing resources and to protect information accessible through computing devices.

Policy enforcement often includes user authentication wherein a user, through various processes, confirms his or her identity in order to gain access to one or more computing resources. For various reasons, users may wish to obtain access to various types of information including sensitive or secure information and it may be desirable to provide users access to such information on their computing devices. In some of these instances, it is often desirable to require more reliable authentication (such as multifactor authentication) before granting user access. Conventional techniques for accomplishing reliable authentication can be cumbersome and, in many instances, may involve unnecessary risk.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to managing access to sensitive information and/or resources in an electronic environment. In particular, some embodiments may require an electronic device to comply with a number of security policies prior to enabling a user of the electronic device access to sensitive information and/or resources. For example, some embodiments enable the electronic device to obtain access to sensitive or secure information and/or resources only when a number of security features are determined to be enforced on the device such as requiring a password of a minimum length, requiring automatic self-wipe after a number of failed attempts (i.e., requiring a device to delete all data from memory), requiring storage encryption, requiring remote-wipe capability (i.e., requiring the device to enable an administrator or a user of the device to have the ability to delete data in the memory remotely), requiring the device to be located within a particular region, requiring the device to be within an altitude or temperature range, etc.

Some embodiments provide an authentication code generation application that is capable of generating an authentication code or verification code, using a random key such as an authentication seed or a shared secret key. The random key can be shared by at least two parties (e.g., a client device and a server), enabling authentication between the parties. Upon the application being activated on a client device, for example, the client device (or a mobile computing device of some embodiments) can automatically send a request to a server to check for device compliance.

In some embodiments, the request includes the user's credentials (e.g., a username, a password). In some instances, the client device may also provide a set of security parameter values that includes information about the client device (e.g., a pin length required on the client device prior to a user gaining access to contents on the device, location information of the device, whether the device complies with certain security requirements (i.e., a confirmation acknowledgement), etc.). The server in some embodiments determines whether the client device complies with the regulations and policies imposed (e.g., by requesting a third party policy enforcement agent to perform the determination, by transmitting program code to the client device for execution, by causing the client device to run a program installed on the client device that performs the determination).

Upon determining that the client device complies with the imposed security policies, the server in this embodiment issues an authentication seed to the client device. In some embodiments, the application on the client device uses the authentication seed to generate the authentication code necessary for the user to obtain access to sensitive information. Some embodiments provide access to secure information upon receiving a valid username, password, and authentication code. For example, the same or a different application on the client device may provide the user access to corporate data upon the user entering a valid username, password, and authentication code.

In some embodiments, the authentication code generation application generates an authentication code upon being activated. An initial sequence or a shared secret may be bootstrapped onto the client device such that the application may generate the authentication code using the shared secret stored or pre-loaded onto the device. The authentication code may be generated based on user credentials (e.g., a username, a password), a current timestamp, and/or an event (e.g., upon a user selection of a selectable user interface item) in addition to the shared secret. In some embodiments, the device may obtain the shared secret through user input of a series of data characters, through scanning a quick response (QR) code within which an authentication code may be embedded.

Upon the generation of the authentication code on the application, the client device of some embodiments automatically sends a request to a server (e.g., a provisioning server) for the server to determine whether the client device complies with the security policies. In some embodiments, the server enables a third party policy enforcement agent to determine whether the client device currently complies with the security policies. Some embodiments enable the server to send program code to the client device for execution in determining whether the client device complies. The server of some embodiments causes the client device to run a program that is installed on the client device to perform the determination.

Upon verifying that the client device complies with the security policies, the server grants the client device access to sensitive information and/or resources. In some embodiments, the sensitive information may be corporate emails, corporate contacts and/or calendar information. By requiring compliance to a series of security policies (e.g., corporate policies) on the client device prior to enabling access to secure information, an interested party (e.g., the corporation) can be reasonably assured that the secure information is well protected. The security policies may also be updated from time-to-time such that the client device adjusts its security settings accordingly. In some embodiments, a policy check is performed periodically while some embodiments perform the policy check every time a verification attempt is made (e.g., when the user attempts to log into a corporate email account).

Various other applications, functions, and advantages are presented below with respect to the various embodiments. It should be understood that the description and figures provide a number of examples, but the alternatives and variations possible within the scope of the various embodiments are not fully described. Alternatives and variations, however, would be apparent to one of ordinary skill in the art in light of the teachings and suggestions contained herein.

Figure 1:
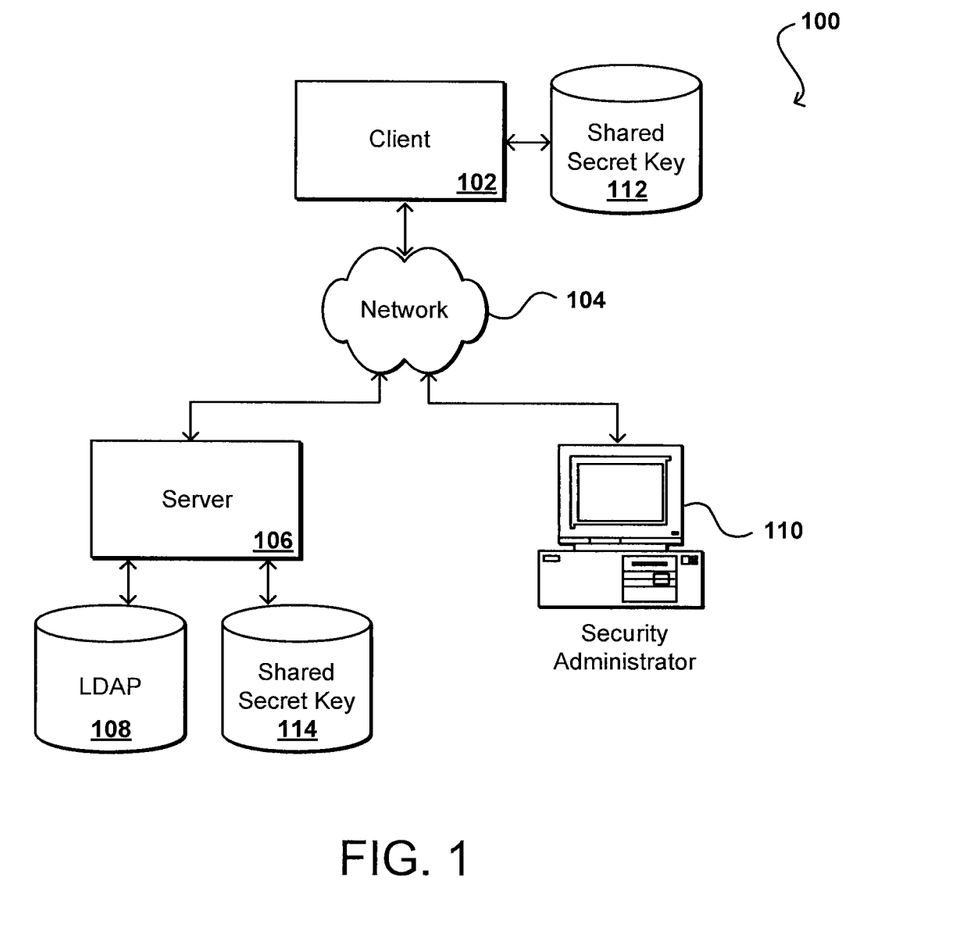
FIG. 1 illustrates an example of a network configuration that can be used in accordance with one embodiment.

FIG. 1 illustrates an example of a network configuration that can be used in accordance with one embodiment. In this example, an end user device or a client device 102 is able to connect through a network 104 to access at least one host or server 106. The client might have access to at least one shared secret data repository 112 for storing one or more shared secret keys or authentication seeds. The server might have access to at least one data repository 108 for use in serving requests from the user device 102 and one shared secret data repository 114 for storing one or more shared secret keys or authentication seeds. The server and the user device may share one or more authentication seeds for authentication. As mentioned, the authentication seed on the user device may be an initial sequence bootstrapped onto the user device prior to a user receiving the user device in some embodiments. The user of the user device may have obtained the authentication seed by scanning a barcode or a QR code, typing in a series of characters, extracting it from an email, etc. In some embodiments, the data stored in storages 108 and 114 are stored in one physical storage (e.g., a hard disk, RAM, etc.). In other embodiments, the various data are stored in separate physical storages (e.g., different types of storages, different disks, etc.), or more than one type of data are stored in one physical storage while the others are in different physical storages. In addition, one or more of the sets of data might be spread across multiple physical storages.

There can be several types of security and management policies used with respect to the user device 102 and the server 106 or database 108, which may be controlled by a security administrator device 110 able to configure and manage security policy compliance for the server, host, and any related components. For example, the user might activate an authentication code generation application that causes the server 106 to perform a policy check on the user device 102. In another example, the server might require secure authentication of the user device 102 in order to provide access to services or functionality provided by the server, and may require different security criteria to access and/or store data in the data repository 108. When authentication of the user device is being performed, one or more shared secret keys in each of the shared secret data repositories 112 and 114 may be used. The user device may generate an authentication code using one or more shared secret keys in its shared secret data repository 112 while the server may authenticate the user device using one or more shared secret keys in its shared secret data repository 114. Various other types of security can be utilized as discussed and suggested elsewhere herein.

Figure 2:
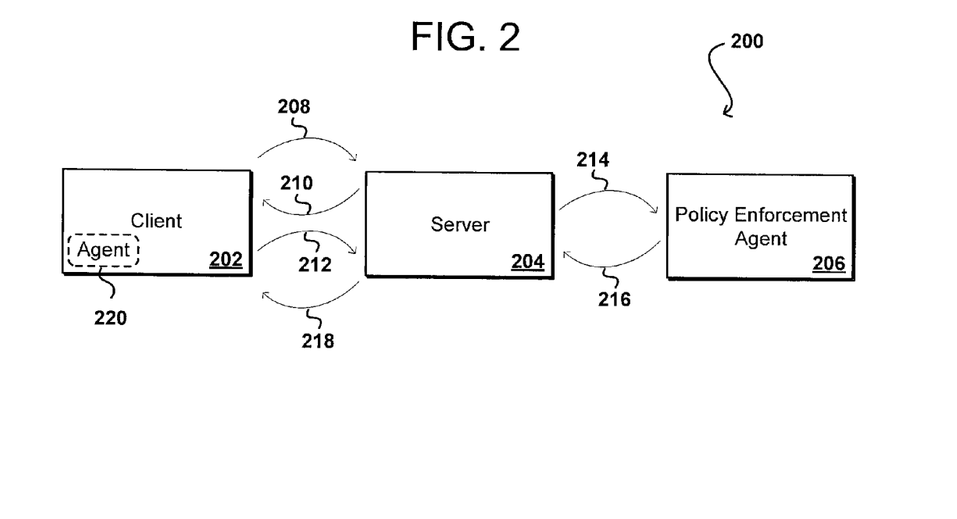
FIG. 2 illustrates an example of an operational flow for verifying client compliance with a series of security policies upon generation of an authentication code in accordance with some embodiments.

FIG. 2 illustrates an example of an operational flow 200 for verifying client compliance with a series of security policies upon generation of an authentication code in accordance with some embodiments. In this example, an application for generating authentication codes (e.g., a softToken generator) is installed on the client device 202. In some embodiments, an authentication code is generated upon the user activating the application or upon the user inputting a valid username and/or password in the application. The application of some embodiments generates the authentication code based on a particular event (e.g., a user selection of a button, every sixty-seconds, every time the application is activated) and/or a current time value in addition to a shared secret value or an authentication seed that is imported onto the device.

In some embodiments, the authentication seed or the initial sequence may be bootstrapped onto the device. Some embodiments generate an authentication code using an authentication seed that was later imported onto the device. For instance, the device may obtain the authentication seed by taking a photo of a barcode in which an authentication seed is embedded, by receiving an incoming text message that includes authentication seed, by a user inputting a long piece of data, etc.

In this example, a request is sent to the server 204 at 208 requesting for access to secure information. The request may include a user's username, a password, and/or the authentication code generated using the authentication seed imported onto the device. In some embodiments, the request is sent to the server in response to the user requesting for access to secure information (e.g., corporate email) through an internal website or an application on the device and a verification of the user's credentials. The client device in some embodiments sends the request to the server in response to receiving the user's credentials (e.g., the username and the password) and upon receiving the generated authentication code. Some embodiments automatically send the request to the server upon generation of the authentication code.

In order to verify that the client device complies with a set of security policies, the server performs a series of interrogations to determine the security policies currently being enforced by the client device in some embodiments. In this example, the server requests the client for a set of parameter values (e.g., configuration information about the client device, compliance confirmations, etc.) corresponding to the set of security policies at 210, the set of parameter values necessary for the server to perform the determination. The set of security policies is specified by an administrator in some embodiments. In some embodiments, the administrator may be corporate security personnel who designated security policy compliance as a condition to granting user access. The set of security policies may include a requirement on the client device's current location to be within a threshold region and/or within a threshold temperature and/or altitude range, a requirement on the client device's pin length to be at least a threshold length, a requirement that the device has remote-wipe enabled, a requirement that the device is connected to a particular set of wireless/wired networks, a requirement that the authenticating party (e.g., the client device) and the authenticator (e.g., the server, the datacenter) or a location chosen by the authenticator (e.g., a headquarters) be within a threshold distance of each other, etc.

The client device sends the set of parameter values requested by the server upon the server's request at 212. In some embodiments, the client device sends the set of parameter values corresponding to the set of security policies without the server requesting for the set of parameter values. The client device may send the set of parameter values along with the user's initial request for access to secure information. In some embodiments, the client device has a copy of the set of security policies such that the set of parameter values are determined prior to the device sending the initial request. Some embodiments enable the client device to request for an updated copy of the set of security policies such that the client device may determine the set of parameter values corresponding to the updated security policies.

In some embodiments, the server performs the determination as to whether the client device complies with the set of security policies. Some embodiments enable the server to send the set of parameter values received from the client device to a third party policy enforcement agent 206 to perform the compliance determination at 214. The policy enforcement agent then determines whether the client device complies with the set of policies in some embodiments. In some embodiments, the client device may perform the policy check by obtaining an updated version of the set of security policies from the server. The client device may then inform the server whether the client device is in compliance upon performing the determination.

In this example, the policy enforcement agent informs the server as to whether the client device complies with the set of security policies upon performing the determination at 216. The server then enables the client device to obtain access to the secure information upon determining that the client device complies with the set of security policies at 218. If the policy enforcement agent determines that the client device fails to comply with the set of security policies, the client device may not have access to the secure information. The client device in some embodiments may adjust its security settings and attempt to gain access again.

In some embodiments, the server may request the client device or cause the client device to execute program code on the client device at 210 (e.g., by sending an agent to the client device), instead of requesting for the set of security parameter values corresponding to the set of security policies. In some embodiments, the agent or the program code can be updated independent of modifications by the client device such that the updated program code may ensure client compliance by e.g., detecting spoofing code. Upon running the program code, the output may be transmitted to the server such that the server may determine whether the client device complies with the security policies. In some embodiments, the server sends the client device executable code or program code upon receiving the client device's initial request for access to secure information. Instead of sending the client device program code, the server of some embodiments may cause the client device to run a downloaded program or agent 220 on the client device upon receiving the client device's initial request.

The client device executes the code and sends the output to the server at 212 in such embodiments. The output may be a series of acknowledgements indicating that the client device does comply with the set of security policies. In some embodiments, the output may be a set of values that enables the server to perform further determination as to whether the client device complies with the security policies. The server then performs the determination as to whether the client device complies with the security policies using the received values or the output from the executed program code and provides access to secure information upon determining that the client device complies at 218 in some embodiments.

Figure 3:
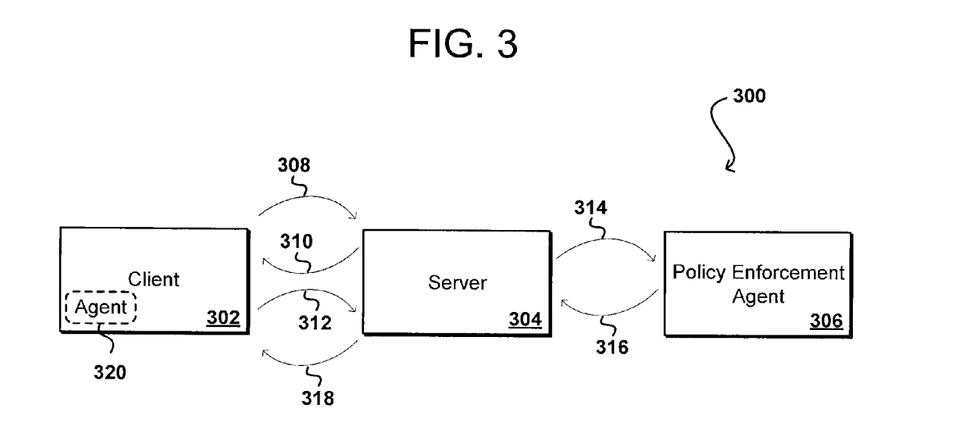
FIG. 3 illustrates an example operation flow for verifying client compliance with a series of security policies prior to enabling the client access to secure information in accordance with some embodiments.

FIG. 3 illustrates an example operation flow 300 for verifying client compliance with a series of security policies prior to enabling access to secure information in accordance with some embodiments. In this example, an application for generating authentication codes using one or more shared secret keys is installed on the client device 302. The client device in some embodiments sends a request to a server 304 at 308 for an authentication seed or a shared secret upon activation of the authentication code generation application on the client device. Some embodiments may send the request to the server upon activation of the application and receiving credentials (e.g., a username and/or a pin) from a user of the client device. In some embodiments, the client device may determine a set of parameter values corresponding to a set of security policies and send the determined set of values to the server (e.g., along with the client device's initial request for the authentication seed) when requesting for the authentication seed.

The server determines whether the client device complies with a set of security policies prior to issuing the authentication seed to the client device. In this example, the server requests a set of parameter values from the client device at 310 in order to determine whether the client complies with the set of security policies. As mentioned above, the set of security policies may be policies enforced by an administrator that requires a number of security mechanisms to be implemented on the device prior to allowing the device to obtain access to secure information. The security policies may include a requirement that the device performs self-wipe after a user of the device performs more than a threshold number of attempts in logging in, a minimum pin length requirement, a requirement that the device has remote wipe enabled, a requirement that the device is situated within a particular altitude range, a requirement that the device is connected to a particular computer network, etc.

In this example, the client device determines and sends the set of parameter values to the server at 312 in response to the server's request for a set of parameter values. While in this example, the server sends the request for the set of parameter values to the client device, in some embodiments, the client device determines and sends the set of parameter values regardless of the server's request. The server may then perform the policy compliance determination using the set of parameter values. In some embodiments, the server requests a third party policy enforcement agent 306 to perform the determination at 314. The policy enforcement agent then determines whether the client device complies with the set of security policies. In some embodiments the policy enforcement agent obtains an updated copy of the security policies from the server periodically. Some embodiments enables the policy enforcement agent to obtain an updated copy of the security policies from the server when the server requests the policy enforcement agent to perform the determination. Upon determining whether the client device complies, the policy enforcement agent informs the server whether the client device is in compliance at 316.

In some embodiments, the server generates an authentication seed and sends the authentication seed to the client device at 318 (e.g., through a secure connection) when the policy enforcement agent has determined that the client device is in compliance. After receiving the authentication seed, the client device may use the authentication seed to generate an authentication code. In some embodiments, the application receives the authentication seed and stores it in memory. The application may then generate a new authentication code using the authentication seed every time the user of the device activates the application in some embodiments. In some embodiments, the client device sends a request to verify that the device is in compliance each time that the application is activated and an authentication code is requested.

As described, the server may request the client device or cause the client device to execute a set of instructions or program code on the client device in order to perform compliance determination at 310, instead of requesting for the set of security parameter values (e.g., a set of values pertaining to the device, a set of values indicating whether the device is in compliance (i.e., yes, no)). The client device may then perform the security policy check as to whether the client device complies with the security policies by executing the set of instructions. In some embodiments, the server transmits executable program code to the client device upon receiving the client device's initial request for the authentication seed. Instead of sending the client device program code, the server of some embodiments may cause the client device to run a pre-downloaded program or agent 320 on the client device upon receiving the client device's initial request.

The client device executes the code and sends the output to the server at 312 in such embodiments. The output may be acknowledgements values indicating that the client device complies with the set of security policies. In some embodiments, the output may be a set of values that enables the server to perform a determination as to whether the client device complies with the security policies. The server then performs the determination as to whether the client device complies with the security policies using the received values or the output from the executed program code and provides an authentication seed or a share secret key value upon determining that the client device complies at 318 in some embodiments.

Figure 4:
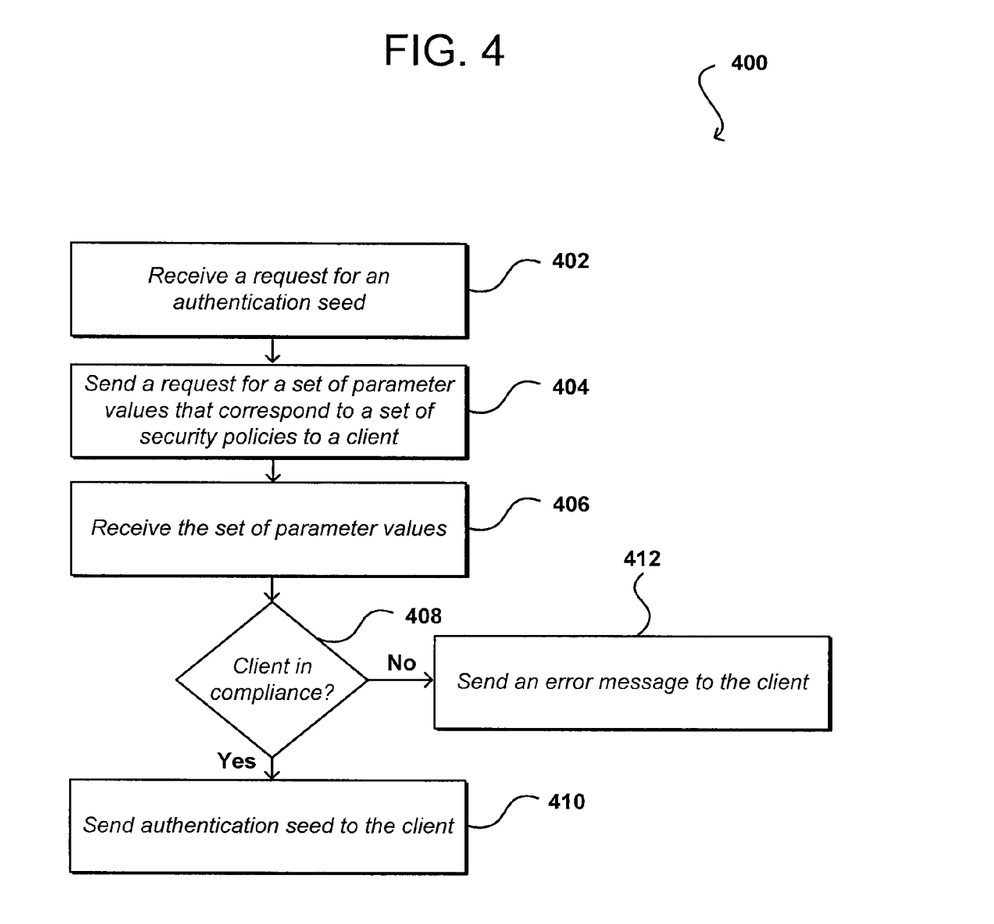
FIG. 4 illustrates an example process for verifying client compliance with a set of security policies enforced by a multi-factor authentication server in accordance with one embodiment.

FIG. 4 illustrates an example process 400 for verifying client compliance with a set of security policies enforced by a multi-factor authentication server in accordance with one embodiment. It should be understood, however, that for any process described herein there can be additional, fewer, or alternative steps performed in similar or alternative orders, or in parallel, unless otherwise stated, within the scope of the various embodiments. In this example, a request for an authentication seed is received from a client device 402. As described, an authentication seed is a shared secret key that includes security information for enabling two parties that possess the authentication seed to authenticate each other. In some embodiments, the client requests an authentication seed from the server, prompting the server to perform a security policy check on the client device prior to issuing the authentication seed to the client device. The authentication seed may be changed through the server (e.g., through a system administrator) or the client (e.g., when a user of the client device manually types several characters of data or scans a barcode within which a seed is embedded).

As mentioned, the server may receive the request for the authentication seed upon an activation of an authentication code generation application in some embodiments. Some embodiments receive the request when a user of the client device inputs a valid username and/or password. In response to the request for the authentication seed from the client device, a request for a set of parameter values that correspond to a set of security policies is sent to the client device 404. In some embodiments, the server sends a request for a set of parameter values to the client in order to determine whether the client complies with a set of security policies imposed by the server. The set of security policies may include a requirement for the client's location to be within a particular region, a password requirement for access to content of the client device, a requirement that remote wipe is enabled on the device, a requirement for an up-to-date patch level installed on the client, a requirement for encrypted storage, a requirement for automatic self-wipe upon a number of incorrect password entries, etc. Different embodiments may impose a different set or a different combination of requirements or security policies with which the client needs to comply prior to enabling the client access to secure or sensitive information.

In some embodiments, instead of requesting for a set of parameter values that correspond to a set of security policies, the server sends a request to the client asking whether the client is in compliance. A copy of the imposed or updated policies may be sent by the server along with the request or retrieved by the client upon receiving the request. In some embodiments, the client may retrieve a copy of the updated policies if its cached copy is too old. The client may also use the copy of the policies that was provisioned when it was created. In some embodiments, the client may then perform the determination and subsequently inform the server whether the client is in compliance.

The set of parameter values is then received from the client device 406. Whether the set of parameter values indicate that the client device is in compliance with the set of security policies is determined 408. In some embodiments, each of the parameter values is determined as to whether it complies with its corresponding security policy is determined. In one instance, a six-digit pin requirement on the mobile device is determined to comply with the security policy that requires a minimum of a four-digit pin. In another instance, an automatic self-wipe capability upon three incorrect pin inputs enabled is determined to comply with one of the security policies imposed requiring automatic self-wipe after a maximum of five attempts. In some embodiments, a security policy may be complied with when one security parameter is met but not the other. For instance, some embodiments may determine that the client complies with one of the security policy requirements when the client device either enables a remote-wipe capability or implements a minimum pin length requirement (e.g., requires at least a 4-digit pin).

Some embodiments enable the server to perform this policy check while some embodiments enable a third party policy enforcement agent to perform the policy check. The server may then send the set of parameter values to the policy enforcement agent to determine whether the set of parameter values indicate that the client is in compliance with the security policies. As described, some embodiments enable the client device to perform the policy check (e.g., by executing program code on the client device or received from the server).

The authentication seed is sent to the client device when the set of parameter values indicates that the client device is in compliance with the set of security policies 410. The client of some embodiments then uses the authentication seed to generate an authentication code. In some embodiments, the authentication code is capable of being generated based on a current time and the authentication seed. Some embodiments generate the authentication code using the current time, the authentication seed, and other additional factors such as a user's username and/or password. The client may then obtain access to sensitive information using the authentication code and/or the username and password in some embodiments.

An error message is sent to the client device when the set of parameter values indicates that the client device is not in compliance with the set of security policies 412. The error message may be displayed on a display element of the client device to inform the user that the configuration of the device is not in compliance with the security policies. In order to obtain access to sensitive information, the configuration or security settings of the device may be modified to comply with the security policies.

Figure 5:
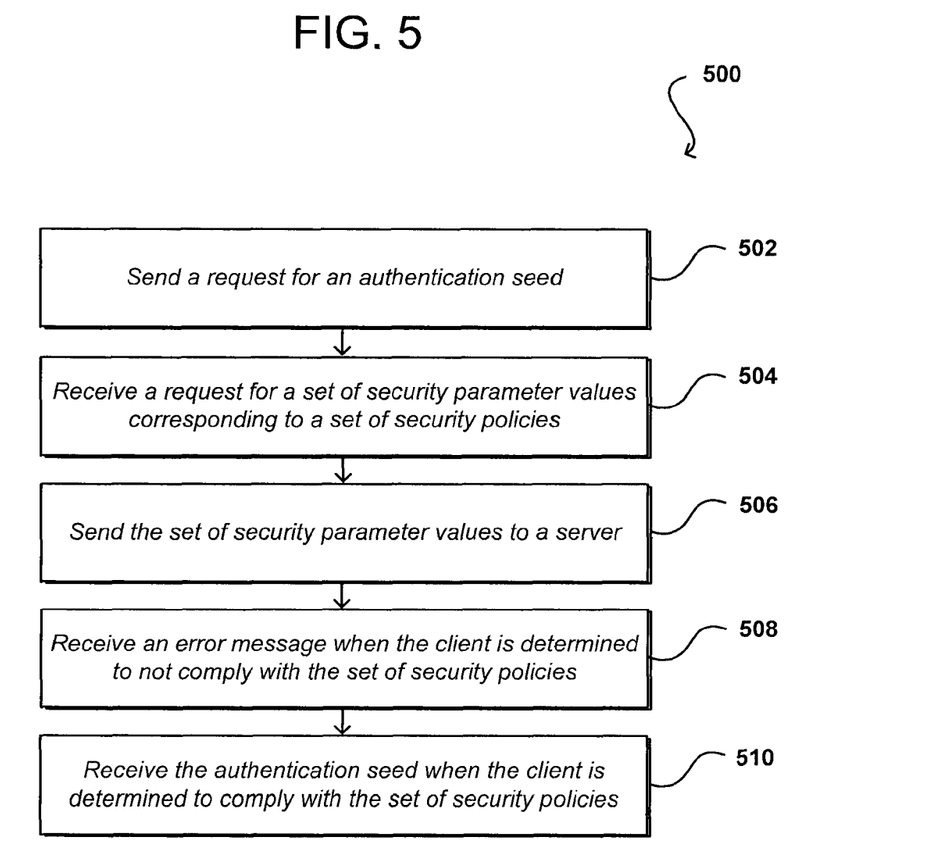
FIG. 5 illustrates an example process for obtaining access to secure information through compliance with a set of security policies in accordance with some embodiments.

FIG. 5 illustrates an example process 500 for obtaining access to secure information through compliance with a set of security policies in accordance with some embodiments. In this example, a request for an authentication seed is sent to a server 502. In some embodiments, a client device sends the request in response to a user of the device attempting to obtain access to secure information. A request is received from the server for a set of security parameter values corresponding to a set of security policies specified by the server 504. As discussed, a number of security policies may be specified to ensure that the client device complies with the security policies prior to being able to access sensitive information.

The set of security parameter values is sent to the server in order to determine whether the client complies with the set of security policies 506. In some embodiments, the server sends the set of security parameter values to an external system or a policy enforcement agent to perform the determination. In some such embodiments, the policy enforcement agent obtains a copy of the security policies and determines whether the client complies with each of the security policies using the set of security parameter values. Some embodiments enable the server to perform the determination as to whether the client device complies with the set of security policies using the set of security parameter values obtained from the device.

An error message is received when the client is determined to not comply with the set of security policies 508. When the client is determined to not comply with the set of security policies, the server sends the client an error message. The client may not obtain access to sensitive information without obtaining an authentication seed or a shared secret key in some embodiments. The authentication seed is received when the client is determined to comply with the set of security policies 510. In some embodiments, the server sends the authentication seed to the client such that the client may use the authentication seed to generate an authentication code. Some embodiments generate the authentication code using a user's username and/or password in addition to the authentication seed. The client is then capable of obtaining access to the secure or sensitive information using the authentication code and/or the username and password in some embodiments.

Figure 6:
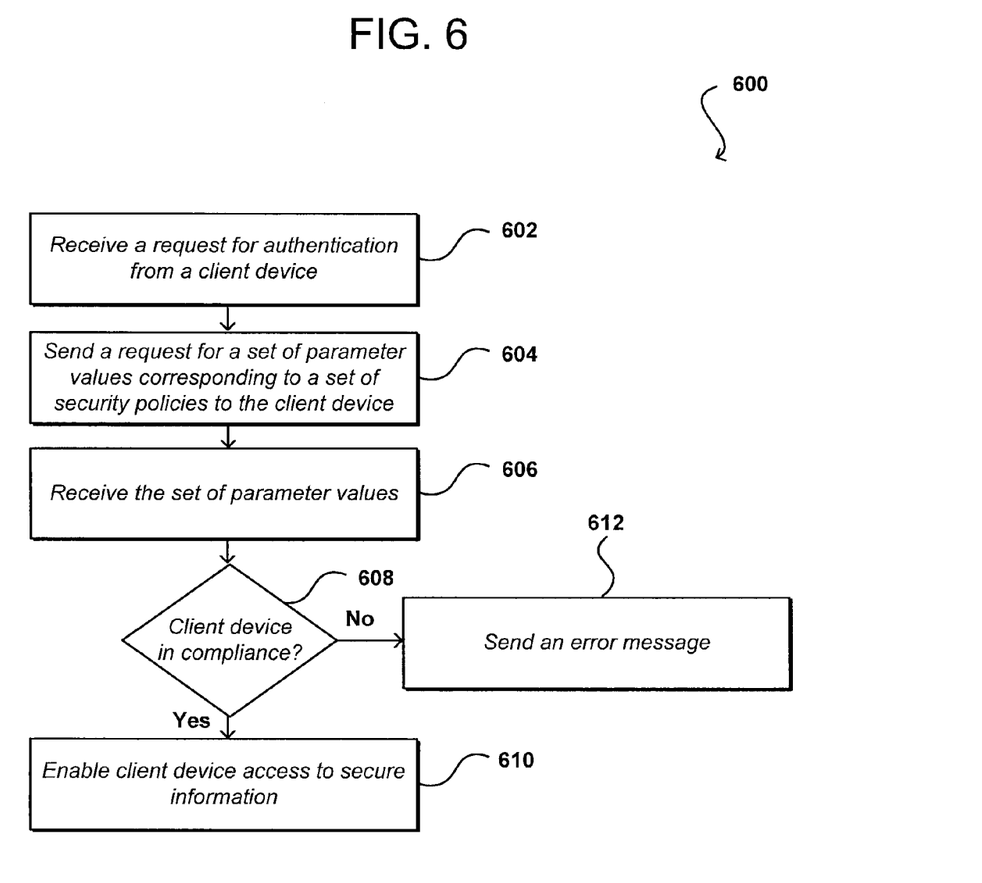
FIG. 6 illustrates an example process for authenticating a client by a server in accordance with some embodiments.

FIG. 6 illustrates an example process 600 for authenticating a client by a server (e.g., a provisioning server) in accordance with some embodiments. In this example, a request for access to secure information from is received the client 602. In some embodiments, the request includes a username, a password, and a response code generated using an authentication seed or a shared secret on the client device. The response code may be generated using the authentication seed and the username and/or password of a user of the client device in some embodiments. In some embodiments, the request is received from the client upon the user activating an application on the client for accessing sensitive information (e.g., an application that provides access to corporate calendar, contacts, and email) and attempting to obtain access to the information upon inputting the username, password, and the response code.

In response to the request, a request for a set of parameter values corresponding to a set of security policies is sent to the client device 604. A server of some embodiments sends a client device a request for a set of parameter values to determine whether the client device complies with the set of security policies. In some embodiments, the set of parameter values is received from the client 606. Whether the set of security parameter values indicates that the client is in compliance with the set of security policies is determined 608. As mentioned above, the server may perform the determination or the server may request an external policy enforcement agent to perform the determination. The set of security parameter values of the client may indicate that the client is in compliance with the set of security policies if each of the security parameter values falls within the permissible range of values indicated by each of the set of security policies.

The client is enabled to access secure information upon determining that the set of security parameter values indicates that the client is in compliance with the set of security policies 610. In some embodiments, the server grants the client access to sensitive information upon determining that the client is in compliance with the security policies. An error message may be sent to the client when the client is determined to not be in compliance with the set of security policies 612. The error message may be displayed to the user of the client device through a user interface of the device.

Figure 7:
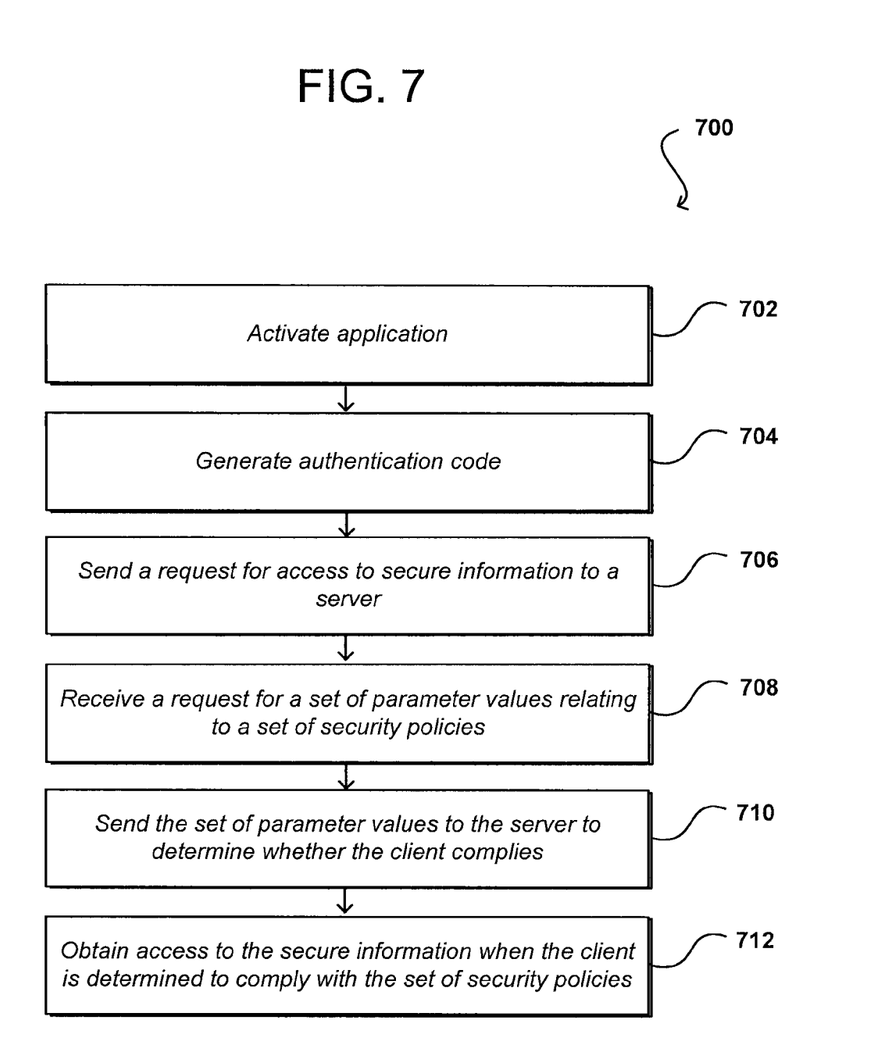
FIG. 7 illustrates an example process for obtaining access to secure information through compliance with security policies in accordance with some embodiments.

FIG. 7 illustrates an example process 700 for obtaining access to secure information through compliance with security policies in accordance with some embodiments. In this example, an application that enables access to secure information is activated 702. In some embodiments, the application is an authentication code generation application. The application in some embodiments may provide access to secure information while providing authentication code generation. An authentication code is generated based on a current time value and a seed value 704. In some embodiments, the seed value is a shared seed or an authentication seed that has been obtained by the client device (e.g., through an e-mail, through SMS, by scanning a barcode, etc.). Some embodiments generate the authentication code using a current time and a seed value while some embodiments may generate the authentication code using additional values such as the username and/or password of the user of the device.

A request for access to secure information is sent to a server 706. The request sent includes the authentication code in some embodiments. A request for a set of parameter values relating to a set of security policies is received 708. In response to the client requesting for access to secure information, the server may request the client to send a set of parameter values relating to a set of security policies. The set of parameter values is sent to the server in order to determine whether the client complies with the set of security policies 710. Access to the secure information is obtained when the client is determined to comply with the set of security policies 712. In some embodiments, the server performs the determination as to whether the client complies with the set of security policies. Some embodiments enable the server to send the set of parameter values to an external system or a policy enforcement agent to perform the determination.

When the server determines that the client complies with the set of security policies, the client may obtain access to the secure information.

Figure 8:
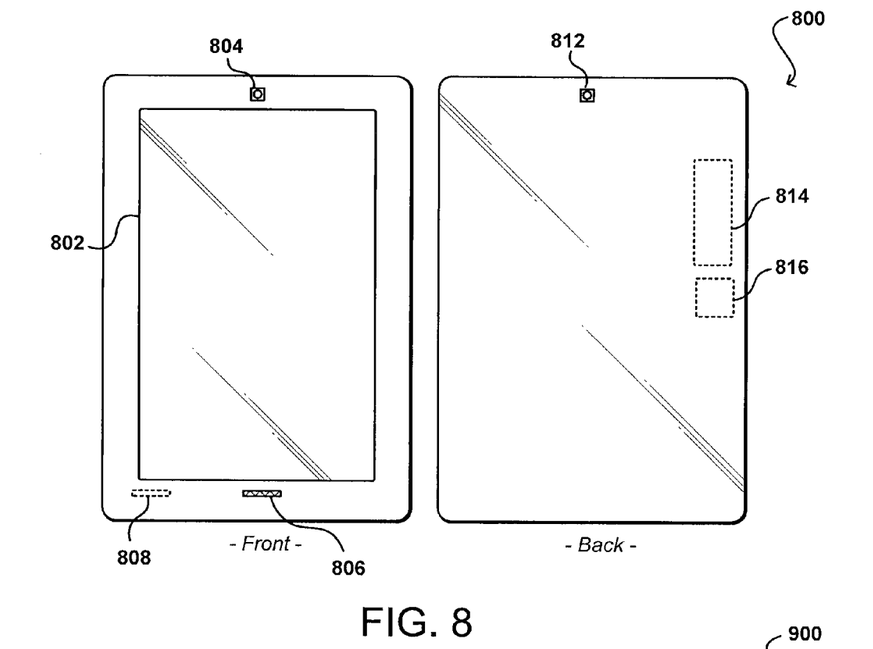
FIG. 8 illustrates front and back views of an example portable computing device that can be used in accordance with various embodiments.

FIG. 8 illustrates front and back views of an example portable computing device 800 that can be used in accordance with various embodiments. Although one type of portable computing device (e.g., a smart phone, an electronic book reader, or tablet computer) is shown, it should be understood that various other types of electronic device that are capable of determining, processing, and providing input can be used in accordance with various embodiments discussed herein. The devices can include, for example, notebook computers, personal data assistants, cellular phones, video gaming consoles or controllers, and portable media players, among others.

In this example, the portable computing device 800 has a display screen 802 (e.g., a liquid crystal display (LCD) element) operable to display image content to one or more users or viewers of the device. In at least some embodiments, the display screen provides for touch or swipe-based input using, for example, capacitive or resistive touch technology. Such a display element can be used to, for example, enable a user to provide input by pressing on an area of the display corresponding to an image of a button, such as a right or left mouse button, touch point, etc.

The example portable computing device can include one or more image capture elements for purposes such as conventional image and/or video capture. While the computing device in this example includes one image capture element 804 on the "front" of the device and one image capture element 812 on the "back" of the device, it should be understood that image capture elements could also, or alternatively, be placed on the sides or corners of the device, and that there can be any appropriate number of capture elements of similar or different types. Each image capture element may be, for example, a camera, a charge-coupled device (CCD), a motion detection sensor, or an infrared sensor, or can utilize another image capturing technology. The computing device can also include at least one microphone 806 or other audio capture element capable of capturing audio data, such as may be used to determine changes in position or receive user input in certain embodiments. In some devices there may be only one microphone, while in other devices there might be at least one microphone on each side and/or corner of the device, or in other appropriate locations.

The device 800 in this example also includes at least one location-determining element 808 operable to provide information such as a position, direction, motion, or orientation of the device. These elements can include, for example, accelerometers, inertial sensors, electronic gyroscopes, electronic compasses, and GPS elements. Various types of motion or changes in orientation can be used to provide input to the device that can trigger at least one control signal for another device. The example device also includes at least one communication mechanism 814, such as may include at least one wired or wireless component operable to communicate with one or more electronic devices. The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

Figure 9:
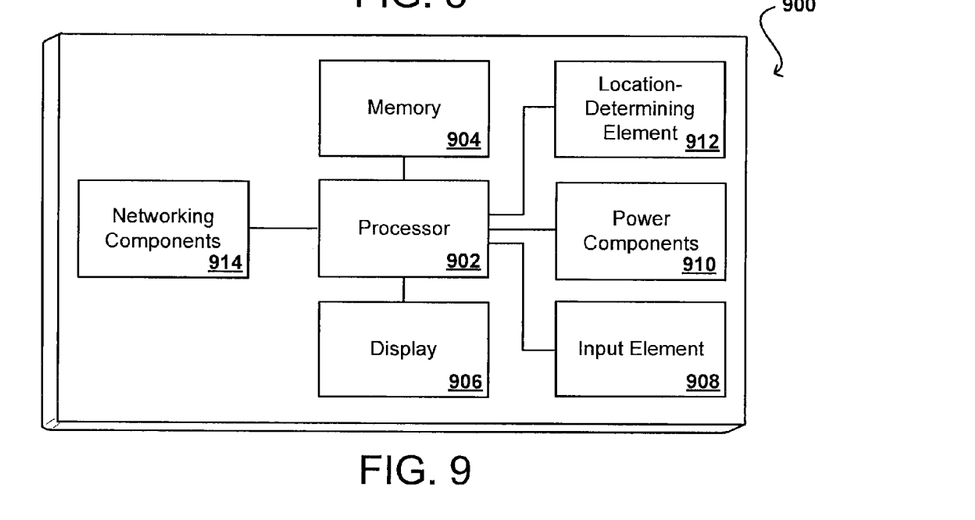
FIG. 9 illustrates a set of basic components of an electronic computing device such as the device described with respect to FIG. 8.

FIG. 9 illustrates a set of basic components of an electronic computing device 900 such as the device 800 described with respect to FIG. 8. In this example, the device includes at least one processing unit 902 for executing instructions that can be stored in a memory device or element 904. As would be apparent to one of ordinary skill in the art, the device can include many types of memory, data storage, or computer-readable media, such as a first data storage for program instructions for execution by the processing unit(s) 902, the same or separate storage can be used for images or data, a removable memory can be available for sharing information with other devices, and any number of communication approaches can be available for sharing with other devices. The device typically will include some type of display element 906, such as a touch screen, electronic ink (e-ink), organic light emitting diode (OLED) or liquid crystal display (LCD), although devices such as portable media players might convey information via other means, such as through audio speakers.

In some embodiments the device can include at least one additional input device 908 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

The device also includes various power components 910, such as may include a battery operable to be recharged through conventional plug-in approaches, or through other approaches such as capacitive charging through proximity with a power pad or other such device. Various other elements and/or combinations are possible as well within the scope of various embodiments.

As discussed, the device in many embodiments will include at least a location-determining element 912 for determining a location of the device (or the user of the device). A location-determining element can include a GPS or similar components operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

The example device also includes one or more networking components 914, such as a cellular network component, wireless Internet component, Bluetooth® mechanism, WLAN connector, and the like. Such a component can enable the device to talk with devices, systems, or services over at least one network, and in some embodiments communicate directly with other computing devices and/or accessories. A wireless Internet component is operable to communicate with one or more electronic devices within a communication range of the particular wireless channel. The wireless channel can be any appropriate channel used to enable devices to communicate wirelessly, such as Bluetooth, cellular, or Wi-Fi channels. It should be understood that the device can have one or more conventional wired communications connections as known in the art.

Figure 10:
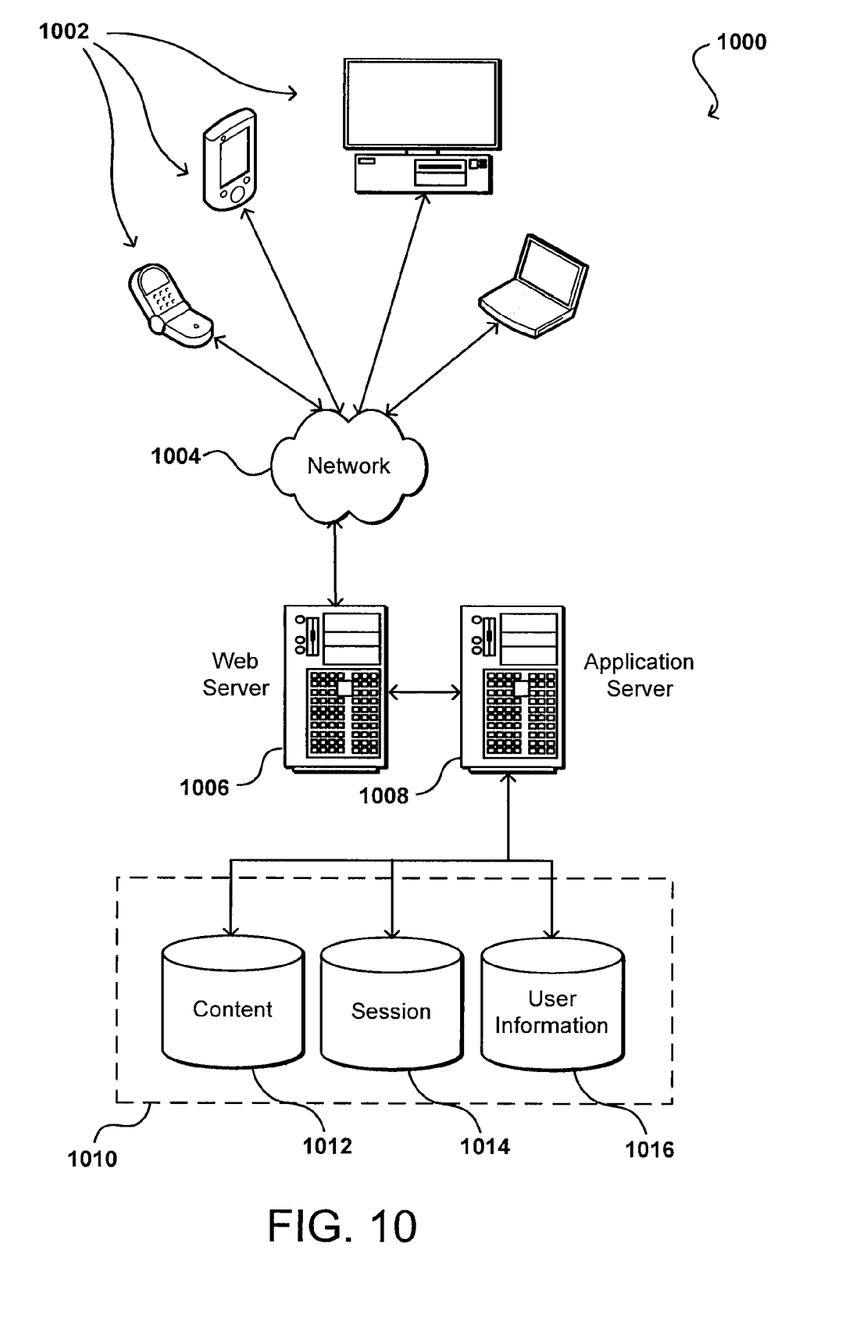
FIG. 10 illustrates an environment in which various embodiments can be implemented.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of verifying client compliance with a set of security policies in order to grant access to secure data, the method comprising:

under control of one or more computer systems configured with executable instructions, receiving, from a mobile device, a request for an authentication seed that includes security information enabling generation of an authentication code that is distinct from the authentication seed;

after receiving the request for the authentication seed from the mobile device, sending a request for a set of parameter values corresponding to a set of security policies to the mobile device in order to determine whether the mobile device complies with the set of security policies;

instructing the mobile device to impose at least one of the set of security policies on the mobile device;

receiving the set of parameter values from the mobile device;

determining whether the set of parameter values received from the mobile device indicates that the mobile device is in compliance with the set of security policies; and after determining, sending the authentication seed to the mobile device to enable the mobile device to generate the authentication code when the set of parameter values indicates that the mobile device is in compliance with the set of security policies, the authentication code being generated based at least in part on the authentication seed.

2. The method of claim 1, wherein the generation of the authentication code is further based on at least one of a current time value, a counter, or the previous authentication code.

3. The method of claim 1 further comprising:

ending an error message to the mobile device when the set of parameter values indicates that the mobile device is not in compliance with the set of security policies.

4. The method of claim 1, wherein the set of security policies comprises at least one of a minimum length of pin, remote wipe being enabled, up-to-date patch level, encrypted storage, automatic self-wipe being enabled upon a maximum number of incorrect entries/attempts, the mobile device being associated with a corporate email system, the mobile device being within a particular altitude range, the mobile device being within a particular temperature range, the mobile device being connected to a particular wireless network, or the mobile device being within a location range.

5. The method of claim 1, wherein determining whether the set of parameter values indicates that the mobile device is in compliance comprises communicating with a policy enforcement agent in real time to certify that the set of parameter values is in compliance with the set of security policies.

6. The method of claim 1, wherein determining whether the set of parameter values indicates that the mobile device is in compliance comprises transmitting software to the mobile device for execution on the mobile device, wherein the set of parameter values received from the mobile device includes an output from the execution of the software.

7. The method of claim 1, wherein the request for the authentication seed is performed upon receiving a username and a password from a user of the mobile device at sign-in time.

8. The method of claim 1, wherein the request for the authentication seed is performed upon activation of an application that generates the authentication code.

9. The method of claim 1, wherein the set of security policies is unknown to the mobile device.

10. A method of authenticating a client by a server, the method comprising:
under control of one or more computer systems configured with executable instructions,
receiving a request for access to secure information from the client, the request including at least a response code generated based at least in part on an authentication seed accessible to the client and the server, the response code being distinct from the authentication seed;
requesting a set of security parameter values from the client upon receiving the request, the set of security parameter values corresponding to a set of security policies imposed by the server;
receiving the set of security parameter values from the client in order to determine whether security settings of the client comply with the set of security policies;
after receiving the set of security parameter values, determining whether the set of security parameter values indicate that the client complies with the set of security policies; and
enabling the client to access secure information upon determining that the client complies with the set of security policies.

11. The method of claim 10, wherein the generation of the response code is further based on at least one of a username, a password, a current time, a counter, a previous authentication code, the request, or a challenge provided by the server.

12. The method of claim 10, wherein the determining comprises communicating with a policy enforcement agent in real time to certify that the set of security parameter values complies with the corresponding set of security policies.

13. The method of claim 10 further comprising:
sending a set of instructions to the client upon receiving the request; and
enabling the client to execute the set of instructions to determine whether the client complies with the set of security policies, wherein the set of security parameter values includes an output from an execution of the set of instructions.

14. The method of claim 10, wherein the set of security parameter values includes an identifier for a current location of the client, the identifier being within a permissible territory specified by the corresponding security policy.

15. The method of claim 10, wherein the request further includes a username and a password, wherein the client access to information is enabled upon verifying the username and the password.

16. The method of claim 10, wherein the set of security policies includes a maximum permissible distance between the client and a location chosen by an authenticating party performing the determination.

17. The method of claim 16, wherein a distance between the client and the location chosen by the authenticating party exceeds the maximum permissible distance when a roundtrip time for a signal between the client and the authenticating party exceeds a threshold duration.

18. A method of obtaining access to secure information through compliance with security policies, the method comprising:
under control of one or more computer systems configured with executable instructions,
activating an application that provides access to secure information;
generating, on a client, an authentication code based at least in part on a seed value, the authentication code being distinct from the seed value;
sending a request for access to secure information to a server, the request including at least the authentication code;
providing a set of parameter values to the server that is configured to determine whether the client complies with a set of security policies, the set of parameter values corresponding to the set of security policies imposed by the server; and
obtaining access to the secure information when the client is determined to comply with the set of security policies.

19. The method of claim 18 further comprising:
receiving a request for the set of parameter values relating to the set of security policies.

20. The method of claim 18, wherein the authentication code is generated using an application that includes the authentication seed bootstrapped onto the client.

21. The method of claim 18 further comprising:
determining a current location using a location-determining element on the client, wherein one of the set of parameter values sent to the server is based on the determined location.

22. The method of claim 18 further comprising:
requesting an updated version of the set of security policies; and
determining whether the client complies using the updated version of the set of security policies.

23. The method of claim 22, wherein the updated version is retrieved each time the request for access to secure information is made to ensure client compliance with updated security policies.

24. The method of claim 18, wherein the client complies with one of the set of security policies when the client includes at least one of a remote-wipe capability being enabled and a minimum pin length requirement.

25. A non-transitory computer-readable storage medium including instructions for obtaining access to secure information using at least an authentication code, the instructions when executed by at least one processor of a computing system causing the computing system to, at least:
send a request for an authentication seed to a server, the authentication seed being distinct from the authentication code;
provide a set of values to the server that is configured to determine whether a client device complies with a set of security policies using the set of values;
receive an error message when the client device is determined to not comply with the set of security policies;
impose, by the client device, at least one of the set of security polices;
receive the authentication seed when the client device is determined to comply with the set of security policies; and
generate the authentication code, by the client device, based at least in part on the authentication seed,
wherein the client device is capable of obtaining access to secure information using the authentication code generated using the authentication seed.

26. The non-transitory computer-readable storage medium of claim 25, wherein the instructions when executed further cause the computing system to:
receive program code;
receive a request to execute the program code; and execute the program code, wherein the set of values is a set of output values from the execution of the program code.

27. The non-transitory computer-readable storage medium of claim 25, wherein the instructions when executed further cause the computing system to:
 install an authentication agent on the client device; and
 receive the set of security policies, wherein the authentication agent determines whether the client device complies with the set of security policies.

28. The non-transitory computer-readable storage medium of claim 25, wherein the instructions when executed further cause the computing system to:
 receive a request for a set of security parameter values corresponding to the set of security policies from the server, the set of values being the set of security parameter values, wherein the server determines whether the client device complies with the set of security policies by determining whether the set of security parameter values complies with the set of security policies.

29. The non-transitory computer-readable storage medium of claim 28, wherein the server sends the set of security parameter values to a policy enforcement agent to perform the determination as to whether the client device complies with the security policies.

30. The non-transitory computer-readable storage medium of claim 25, wherein the instructions when executed further cause the computing system to activate an application that is capable of providing an authentication code.

31. A system for verifying client compliance with a set of security policies in order to grant client access to secure data, the system comprising:
 a processor; and
 memory device including instructions that, when executed by the processor, cause the system to, at least:
 receive a request for an authentication seed;
 after receiving the request for the authentication seed, sending, to the client, a request for a response corresponding to a set of security policies;
 receive the response from the client after sending the request regarding the set of security policies;
 determine whether the response indicates that the client is in compliance with the set of security policies;
 instruct the client to impose at least one of the set of policies on the client;
 send the authentication seed to the client upon determining that the response indicates that the client is in compliance with the set of security policies; and
 generate an authentication code based at least in part on the authentication seed, the authentication code being distinct from the authentication seed,
 wherein the client is capable of obtaining access to sensitive information using at least the authentication code.

32. The system of claim 31, wherein the response is a set of parameter values requested by a server, the set of parameter values including at least one of configuration information of the client or acknowledgement responses.

33. The system of claim 31, wherein the instructions when executed further cause the system to:
 send a computer program including a set of instructions for execution on the client, wherein the received response is an output of the computer program.

34. The method of claim 1, further comprising, when the set of parameter values indicates that the mobile device is in compliance with the set of security policies, generating the authentication seed prior to the authentication code being generated.

35. The method of claim 1, wherein a new authentication code is generated based at least in part on the authentication seed each time the mobile device activates an application to access the secure data.

36. The method of claim 1, wherein the authentication code is generated based at least in part on the authentication seed and additional data available to the mobile device.

37. The method of claim 1, wherein the authentication code is generated based at least in part on the authentication seed and a current time.

* * * * *